United States Patent [19]

Akiyama et al.

[11] 4,107,153

[45] Aug. 15, 1978

[54] HEAT-RESISTANT THERMOSETTING POLYIMIDE RESIN

[75] Inventors: Keiichi Akiyama, Yokosuka; Junichi Kamiuchi, Yokohama; Itsuo Matsuda, Chofu; Takara Fujii, Yokohama, all of Japan

[73] Assignee: Toshiba Chemical Products Co., Ltd., Tokyo, Japan

[21] Appl. No.: 615,933

[22] Filed: Sep. 23, 1975

[30] Foreign Application Priority Data

Sep. 25, 1974 [JP] Japan .................................. 49/109505
Mar. 6, 1975 [JP] Japan .................................. 50/27292
Mar. 6, 1975 [JP] Japan .................................. 50/27293

[51] Int. Cl.$^2$ ............................................ C08G 69/26
[52] U.S. Cl. ............................ 528/322; 260/32.6 NA; 260/37 N; 260/830 P; 260/837 R; 528/96; 528/117; 528/125; 528/170; 428/413; 428/435; 428/474; 528/321

[58] Field of Search ......... 260/78 UA, 47 CZ, 47 UA, 260/65, 63 N, 77.5 C

[56] References Cited

U.S. PATENT DOCUMENTS 3,770,705  11/1973  Akiyama et al. ............... 260/78 UA

*Primary Examiner*—Harold D. Anderson
*Attorney, Agent, or Firm*—Carroll F. Palmer

[57] ABSTRACT

A heat-resistant thermosetting resin composition is obtained by reaction with each other of an N,N'-bis-imide of unsaturated dicarboxylic acid (A), a cyanuric or isocyanuric acid or derivatives thereof (B), and at least one compound (C) selected from the group consisting of tetracarboxylic acid diimide, hydantoin and derivatives thereof, and barbituric acid and derivatives thereof. This resin composition has excellent heat-resistance and workability, and is employed for the use of a molding, laminated sheet, adhesive, etc.

6 Claims, No Drawings

HEAT-RESISTANT THERMOSETTING POLYIMIDE RESIN

BACKGROUND OF THE INVENTION

This invention relates to a resin composition having excellent heat-resistance and workability, and more in detail to a heat-resistant thermosetting resin composition obtained by reaction with each other of an N,N'-bis-imide of unsaturated dicarboxylic acid (A), a cyanuric or isocyanuric acid or derivatives thereof (B), and at least one compound (C) selected from the group consisting of tetracarboxylic acid diimide, hydantoin and derivatives thereof, and barbituric acid and derivatives thereof.

As the heat-resistant polyimide resin a polyimide resin of Du Pont type is well known which is obtained by condensation polymerization, and immediately following dehydration reaction, of diamine with a tetracarboxylic acid anhydride typically represented by pyromellitic anhydride. This polyimide resin is excellent in heat-resistance but its resinous solution (prior to the dehydration reaction) is low in stability. Further, since this polyimide resin presents the difficulties in terms of workability as attributed to the occurrence of dehydration reaction, the volatilization of low molecular compounds, etc. in the course of its resinification, it is not suitable to the fabrication of a molding and laminated sheet.

A polyimide resin of Rhone-Poulenc type is also known which is obtained by reacting diamine with an N,N'-bis-maleimide (see, for example, U.S. Pat. No. 3,562,223). This type of polyimide resin is not followed by a dehydration reaction in the course of its solidification and therefore is suitable to the manufacture of a laminated sheet, but is insufficient in mechanical strength such as bending strength. Where aliphatic polyamine is used as diamine, the reaction proceeds rapidly but the resulting polyimide resin is low in heat-resistance. Where aromatic polyamine is used as diamine, the reaction time covers several to scores of hours at a temperature of, for example, 160° to 250° C even in the case of a fusing method.

A method of producing a polyimide resin from reaction of N,N'-bis-imide with isocyanuric acid is also attempted (see, for example, U.S. Pat. No. 3,770,705). In this method, however, not only the reaction process is complicated but also is the resulting polyimide resin insufficient in terms of electric properties.

SUMMARY OF THE INVENTION

The object of the invention is to provide a thermosetting resin composition (polyimide resin) which has not only excellent heat resistance and workability but also electric property such as electric insulating property, film moldability, and high mechanical strength, and is capable of being applied to the fabrication of a molding, laminated sheet and adhesive.

The above object and other objects becoming apparent from the following description are achieved by a heat-resistant thermosetting resin composition obtained by reaction with each other of an N,N'-bis-imide of unsaturated dicarboxylic acid (A) which is expressed by the general formula:

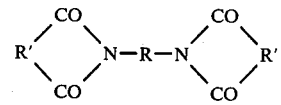

(wherein R is a divalent radical having at least two carbon atoms and R' is a divalent radical having a carbon-carbon double bond), a cyanuric or isocyanuric acid or derivatives thereof (B), and at least one compound (C) selected from the group consisting of tetracarboxylic acid diimide, hydantoin and derivatives thereof, and barbituric acid and derivatives thereof.

DETAILED DESCRIPTION OF THE INVENTION

A heat-resistant thermosetting resin composition according to the invention is produced by reacting with each other an N,N'-bis-imide of unsaturated dicarboxylic acid (A) which is expressed by the general formula:

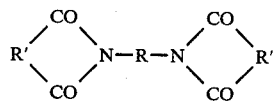

(where R is a divalent radical having at least two carbon atoms and R' is a divalent radical having a carbon-carbon double bond), a cyanuric or isocyanuric acid or derivatives thereof (B), and at least one compound (C) selected from the group consisting of tetracarboxylic acid diimide, hydantoin and derivatives thereof, and barbituric acid and derivatives thereof, in an inactive solvent.

In the general formula:

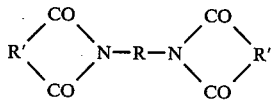

(wherein R is a divalent radical having at least two carbon atoms and R' is a divalent radical having a carbon-carbon double bond) of the N,N'-bis-imide of unsaturated dicarboxylic acid (A) used in the invention, said R includes the following radicals: straight or branched alkylene radical having a ring of five to six carbon atoms, heterocyclic radical having at least any one of oxygen, nitrogen and sulfur, phenylene radical, polycyclic aromatic radical, and a plurality of phenylene or alicyclic radicals directly bonded with any one of $-O-$, $-CH_2-$, $-SO_2-$, $-NHCO-$, $-NR_5-$, $-NR_5R_6-$, etc. (where each of $R_5$ and $R_6$ represents a given one of alkyl radical having one to four carbon atoms, cycloalkyl radical having a ring of five to six carbon atoms, and phenyl radical). Further, said R' includes acid radical having a carbon-carbon double bond such as maleic, citraconic and tetrahydrophtalic acid radical.

Preferable N,N'-bis-imides of unsaturated dicarboxylic acid (A) include N,N'-4,4'-diphenylmethane-bis-maleimide, N,N'-4,4'-diphenylether-bis-maleimide, N,N'-paraphenylene-bis-maleimide, N,N'-benzidine-bis-maleimide, N,N'-metaxylene-bis-maleimide, N,N'-1,5-naphthalene-bis-maleimide, N,N'-4,4'-diphenylsulphone-bis-maleimide, N,N'-2,2'-4,4'-dimethylene-cyclohexane-bis-maleimide, N,N'-4,4'-dicyclohexylmethane-bis-maleimide, N,N'-4,4'-diphenylcyclohexane-bis-maleimide, N,N'-4,4'-diphenylphenylamine-bis-maleimide, N,N'-4,4'-diphenyldipheylsilane-bis-maleimide, N,N'-4,4'-diphenylsulfide-bis-maleimide, N,N'-2,2'-(4,4'-diphenyl)-propane-bis-maleimide, N,N'-metaphenylene-bis-maleimide, and N,N'-3,3'-(N,N'-metaphenylene-bis-benzamido)-bis-maleimide.

These N,N'-bis-imides may be used singly or in combination with each other.

The cyanuric acid and isocyanuric acid are referred to as tautomers and in a neutral or acid solution of the tautomers are present in the form of keto-type (isocyanuric acid). Accordingly, the compound (B) employed in the invention may be any one of the cyanuric acid and isocyanuric acid, or may be a given derivative thereof, for example, tris (epoxy propyl) isocyanurate.

As preferable examples of the tetracarboxylic acid diimide as one of the above-mentioned compounds (C) used in the invention there are pyromellitic diimide, benzophenone tetracarboxylic acid diimide, 2,3,6,7-naphthalenetetracarboxylic acid diimide, 3,3',4,4'-diphenyltetracarboxylic acid diimide, or the like. These diimides may be used singly or in combination with each other.

The hydantoin and the derivatives thereof as belonging to one of the above-mentioned compounds (C) are expressed by the general formula:

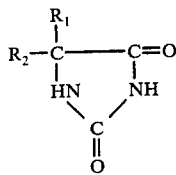

(wherein $R_1$ and $R_2$ may be the same or different, representing hydrogen or alkyl radical). As preferable examples there are hydantoin, 5,5'-dimethyl hydantoin, 5-n-propyl hydantoin, 5-isopropyl hydantoin, or the like. These compounds may be used singly or in combination with each other.

The barbituric acid and the derivatives thereof as belonging to one of the above-mentioned compounds (C) are expressed by the general formula:

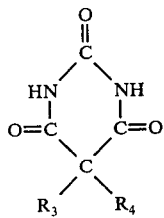

(wherein $R_3$ and $R_4$ may be the same or different, representing hydrogen or alkyl radical including $-CH_3$, $-C_2H_5$, $-C_6H_5$, $-CH(CH_3)_2$, $-CH_2CH(CH_3)_2$, $-CH_2CH_2CH(CH_3)_2$, or

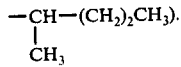

As preferable examples there are barbituric acid, barbital, phenobarbital, amobarbital, pentobarbital, secobarbital, butabital, ethylhexabital or butethal. These compounds may be used singly or in combination with each other.

The reaction of said N,N'-bis-imide of unsaturated dicarboxylic acid (A) with the compound (B) or (C) is the addition polymerization reaction of carbon-carbon double bonds of the N,N'-bis-imide (A) with NH radicals adjacent to the CO radical of the compound (B) or (C). For example, the reaction of the N,N'-bis-maleimide with the isocyanuric acid can be expressed as follows.

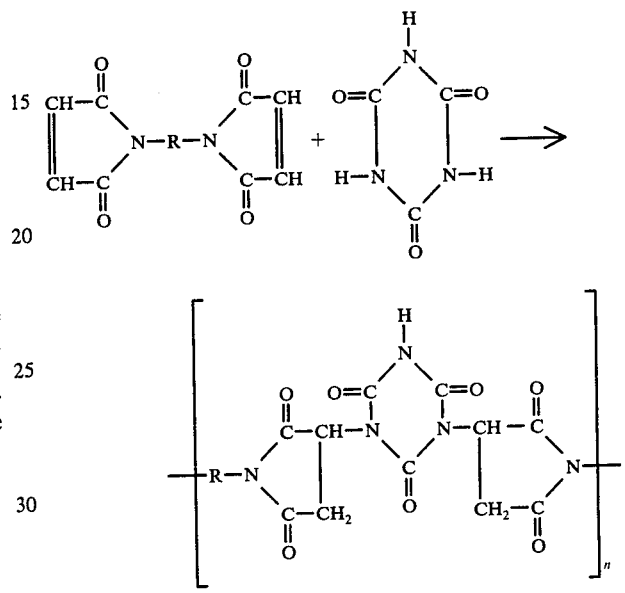

The proportion of the compounds (B) and (C) used for the production of the present resin should be chosen such that $0 < B/(B + C) \leq 0.5$, said B and C being expressed in terms of mol. Where the compound (B) such as the isocyanuric acid is not employed at all, the resulting resin becomes low in crosslinking density or is not reticulated whatsoever, failing to obtain a resin having a desired property. Further, where said proportion becomes higher than 0.5 as a result of increasing the amount of compound (B) a gelation phenomenon takes place before a desired polymerization is not attained or the resulting resin is deteriorated in respect of workability. On the other hand, the proportion of the compounds (A), (B) and (C) should be chosen such that $1 \leq A/(B+C) < 2$, said (A), (B) and (C) being expressed in terms of mol. Where this proportion is smaller than 1, the heat resistance and electric and mechanical properties of a resin obtained are deteriorated, and the hardness thereof becomes unsatisfactory. Conversely, where this proportion is 2 or more, a resin obtained is liable to have an unreacted portion, failing to obtain a desired heat-resistant thermosetting resin composition.

Production of the heat-resistant thermosetting resin composition is carried out in an inactive solvent using a reaction apparatus equipped with a stirrer, reflux condenser, thermometer, inert gas-introducing tube and heater. The use of the inactive solvent is for the purpose of preventing the imide ring from being opened and keeping the carbon-carbon double bond to be active. The inactive solvents available include, for example, dimethyl formamide, dimethyl acetamide, dimethyl sulfoxide, N-methylpyrrolidone, and hexamethylphosphoramide. The reaction temperature is in the range of about 100° to 180° C. This reaction preferably is carried out in an atmosphere of inert gas such as $N_2$ gas or $CO_2$ gas. This reaction is promoted if using as a catalyst a compound having a phenolic hydroxy radical such as cresol. Further, if proton donative acid such as acetic acid is mixed into the reaction mass, self-polymerization of the N,N'-bis-imide (A) is suppressed and the reaction proceeds smoothly. As the reaction proceeds, the reaction mass is gradually increased in viscosity. Accordingly, where the present resin composition is to be used for laminated sheet or adhesive, the curing time of the reaction mass is measured and the reaction is stopped at an appropriate point of time. Further, where the present resin composition is to be used for a molding, the reaction is allowed to proceed until the reaction mass comes to have a sufficiently high viscosity.

As customarily carried out where a polymer having a high degree of polymerization is desired, it is also possible to cool the reaction mass to room temperature after more than one hour has elapsed from the start of the reaction and then add a minute amount of catalyst to the reaction mass and cause the polymerization reaction to proceed at room temperature. As the catalyst used in this case, there are sodium, potassium and lithium salt of t-butyl or n-butyl alcohol, a base such as tri-n-butyl boron (n-$Bu_3B$) or n-butyl lithium (n-BuLi), tertiary amine such as triethyl amine or dimethyl benzylamine, etc.

Where it is desired to improve the hardenability and mechanical strength of the heat-resistant resin of the invention, the heat-resistant resin has only to be denatured by substituting a given one of epoxy compounds for part of the N,N'-bis-imide of unsaturated dicarboxylic acid (A). The amount of epoxy compound added is usually on the order of 30% of the compound (A). Attention, however, should be paid to the respect that when the adding amount of epoxy compound is increased, the resultant resin is indeed decreased in cost but is deteriorated in heat resistance.

The heat-resistant thermosetting polyimide resin of the invention can be used to fabricate a molding, laminated sheet or adhesive by properly selecting the reaction conditions. That is to say, after sufficiently polymerized, the reaction mass is subjected to the removal of solvent and crushed. Thereafter, a usual filler such as silica or graphite is added and peroxide, azobisisobutyro nitrile, etc. are further added as required, to the crushed mass. Thus, the resulting polyimide resin becomes a resin for application to a molding. Where the reaction mass is epoxy-denatured, an epoxy curing agent such as acid anhydride, amine or $BF_3$ must be further added to the denatured polyimide resin. Further, after the lapse of a prescribed length of curing time, a solvent having been used in the reaction is replaced as required, by another solvent having a low boiling point, and a usual curing agent or curing catalyst is added to the reaction mass, and the resulting mass is coated on a substrative material such as glass cloth to cause said solvent to volatilize for removal thus to obtain a so-called "prepreg". The "prepegs" in several number are overlapped one upon another and the overlapped mass of "prepregs" is molded by heating under pressure. Thus, a laminated sheet is fabricated. Further, after the lapse of a prescribed length of curing time, a solvent having been used in the reaction is replaced as required, by another solvent having a low boiling point, and a polyfunctional epoxy resin is mixed as required into the reaction mass, and a curing agent or curing catalyst is added. Thus, an adhesive is obtained.

The heat-resistant thermosetting polyimide resin of the invention has heat-resistance at a level of 240° C. This heat-resistance is substantially as high as that of the polyimide resin of Du Pont type. Further, since, in the polyimide resin of the invention, the curing reaction is not followed by a dehydration condensation reaction, a complicated molding operation based on the consideration of, for example, degassing is not required. The present polyimide resin, therefore, is more excellent in workability than a conventional polyimide resin. Further, the present polyimide resin has good mechanical and electrical properties and is therefore applicable also to an instrument or appliance of heat-resistant structure and usable also as an insulating material.

This invention can be more fully understood from the examples which follow.

EXAMPLE 1

A 500 cc-flask equipped with a stirrer, thermometer, reflux condenser and $N_2$ gas-introducing tube was charged with about 43 grams (0.12 mol) of N,N'-4,4'-diphenylmethane-bis-maleimide, about 15 grams (0.07 mol) of pyromellitic diimide, about 4.3 grams (0.033 mol) of cyanuric acid and, about 180 grams of dimethyl formamide. This mixture was heated at a temperature of 150° to 155° C while being stirred in an atmosphere of nitrogen gas. After the reaction was continued for 5 hours at that temperature, part of the reaction mass was sampled, and 45% of graphite based on the sampled resin weight was added to the sampled mass, and the resulting mass was washed with water to remove the solvent. Next, the mass was Soxhlet-extracted with ethanol for 6 hours and was vacuum-heated (65° C, 2 mm Hg) for 3 hours to remove the volatile matter. A resin-graphite mixture thus obtained was compression-molded under a pressure of 100 kg/$cm^2$ at a temperature of 210° C to obtain a molding. This molding had a bending strength of 12 kg/$cm^2$ at a temperature of 25° C, and had a friction coefficient of 0.03 under a load of 100 g at a linear velocity of 2 m/sec. Further, although the molding had a frictional surface temperature of 240° C, it presented little frictional deterioration, which indicates an excellent heat resistance.

A solution of resin obtained (curing time was 4 minutes at 200° C) under the same condition as mentioned above excepting that the reaction time was four hours was coated on a glass cloth and dried at a temperature of 150° to 155° C to prepare a "prepreg". The "prepregs" in eight number were overlapped one upon another and this unit of eight overlapped "prepregs" was subjected to pressure for 10 minutes at 160° C and then for 1 hour at 200° C to manufacture a laminated sheet. This laminated sheet had a dielectric dissipation factor of 1% or less at 230° C.

EXAMPLE 2

About 86 grams (0.24 mol) of N,N'-4,4'-diphenylmethane-bis-maleimide, about 8.5 grams (0.066 mol) of cyanuric acid, and about 17.93 grams (0.14 mol) of 5,5'-dimethyl hydantoin were reacted in 240 grams of dimethyl formamide at a temperature of 150° to 155° C in the same manner as in Example 1. Thereafter, the mass was cooled to room temperature and 0.3 gram of sodium t-butyloxide was added to the mass. Thereafter, the resulting mass was gradually heated and was reacted for 1½ hours at 80° C. Then, part of the reaction mass was sampled, and 40% of graphite based on the sampled resin weight was added to the sampled mass, and the resulting mass was washed with water to remove the solvent and then was powdered. The resin powder thus obtained was compression-molded for 2 minutes at 170° C under a pressure of 5 kg/cm$^2$, and then was compression-molded for about 30 minutes under a pressure of 50 kg/cm$^2$ up to 200° C. The molding thus obtained was heat-treated at 200° C for 15 hours and was solidified. This molding had a bending strength of 13 kg/cm$^2$ at 25° C and had a friction coefficient of 0.03 under a load of 100 kg at a linear velocity of 1 m/sec. Though the temperature of the frictional surface of the molding was raised up to 225° C, the molding presented little frictional deterioration.

EXAMPLE 3

A 4-hour reaction was carried out at 150° to 155° C in the same manner as in Example 2 except that about 25.79 grams (0.14 mol) of barbital was used in place of 5,5'-dimethyl hydantoin. Thereafter, the reaction mass was cooled to room temperature and 0.3 gram of sodium n-butyloxide was added (0.013 mol % based on the amount of N,N'-bis-maleimide). The resulting mass was then gradually heated at 80° C for 45 minutes and then was reacted at 100° C for 10 minutes. The reaction mass was partially sampled and this sampled mass was molded similarly to Example 2. The molding thus obtained had a bending strength of 14 kg/cm$^2$ at 25° C and had a friction coefficient of 0.04 under a load of 100 g at a linear velocity of 1 m/sec. Although the frictional surface temperature of the molding was increased up to 230° C, the molding indicated little frictional deterioration.

EXAMPLE 4

About 86.5 grams (0.24 mol) of N,N'-4,4'-diphenylether-bis-maleimide, about 5.16 grams (0.04 mol) of cyanuric acid, about 19.2 grams (0.06 mol) of benzophenonetetracarboxylic acid diimide were reacted in 165 grams of dimethylformamide for 2 hours using the reaction apparatus of Example 1 while being stirred at 150° to 155° C. Next, about 15.37 grams (0.12 mol) of 5,5'-dimethyl hydantoin was added to the resulting mass and the reaction was carried out at the same temperature for 2 hours. Thereafter, the resulting mass was cooled to room temperature, and 1.2 grams of triethyl amine was added, and the mass was stirred. The resin solution thus obtained was coated on a satin type glass cloth treated with γ-aminopropyl triethoxysilane, and was dried at 160° C for 5 minutes to obtain a "prepreg". Next, the "prepregs" in several number were overlapped one upon another, and this unit of overlapped "prepregs" was preliminarily molded at 200° C and was compression-molded at the same temperature under a pressure of 50 kg/cm$^2$ for 30 minutes and then was cooled down to 130° C. At this point of time, pressure release was carried out to manufacture a laminated sheet. This laminated sheet was further heat-treated at 200° C for 15 hours to be subjected to post cure. Said laminated sheet had a dielectric dissipation factor of 0.02 % and had a bending strength of 48 kg/cm$^2$. These values remained unvaried even after said laminated sheet was heat-treated at 230° C for 300 hours.

EXAMPLE 5

A laminated sheet was fabricated in the same manner as in Example 4 excepting that about 22.1 grams (0.12 mol) of barbital was used in place of 5,5'-dimethyl hydantoin. This laminated sheet had a dielectric dissipation factor of 0.03% and had a bending strength of 46 kg/cm$^2$. These values remained unvaried even after said laminated sheet was heat-treated at 230° C for 300 hours.

EXAMPLE 6

About 34 grams (0.09 mol) of N,N'-4,4'-diphenylmethane-bis-maleimide, about 21.6 grams (0.1 mol) of pyromellitic di-imide, about 9.5 grams (0.03 mol) of Epicoat #828 (which is a reaction product of bis-phenol with epichlorohydrin, manufactured by Shell Company and known under this trade name), and about 3 grams (0.01 mol) of tris (epoxypropyl) isocyanurate were reacted in 200 grams of dimethyl formamide and 3 grams of metacresol at 150° to 155° C for 4 hours in the same manner as in Example 1. Part of the reaction mass was sampled, and the sampled mass was treated and molded similarly to Example 1 to prepare a molding. The molding thus prepared had a bending strength of 15 kg/cm$^2$ at 250° C and a friction coefficient of 0.05. Though the frictional surface temperature of the molding was 210° C, the molding presented little frictional deterioration.

EXAMPLE 7

About 27.7 grams (0.077 mol) of N,N'-4,4'-diphenylether-bis-maleimide, about 14.73 grams (0.046 mol) of benzophenonetetracarboxylic acid diimide, about 12.5 grams (0.033 mol) of Epicoat #828, and about 4.65 grams (0.036 mol) of cyanuric acid were reacted in 180 grams of dimethyl formamide at 150° to 155° C for about 3 hours in the same manner as in Example 1. Since the viscosity of the reaction mass was increased, about 50 grams of dimethyl formamide was further added thereto to decrease the viscosity of the resin solution. This resin solution was coated on a tinplate, and was heated for desiccation at 120° C for 30 minutes and in succession at 160° C for 1 hour, to form a film. The film stripped off by mercury-amalgam method had a tensile strength of 14 kg/cm$^2$, that is to say, the film was stiff and yet flexible. The heat loss that this film suffered at 220° C for 200 hours was 1.8 %.

EXAMPLE 8

About 45 grams (0.168 mol) of N,N'-metaphenylenebis-maleimide, about 17.7 grams (0.082 mol) of pyromellitic diimide, and about 6.45 grams (0.05 mol) of cyanuric acid were reacted in about 170 grams of dimethyl formamide at 150° to 155° C for 3 hours in the same manner as in Example 1. Next, about 72.0 grams (0.072 mol) of Epicoat #1001 and about 10.5 grams (0.082 mol) of 5,5'-dimethyl hydantoin were added to the reaction mass, and the resulting mass was further reacted for 1½ hours and thereafter was cooled to room temperature. 0.2 gram of dimethylbenzylamine was added, and the resulting mass was reacted at 80° C several minutes until the reaction mass was allowed to gelate and then was cooled rapidly and then was washed with water to remove the solvent. And the resin obtained was powdered by a mixer. 300 weight parts of silica was added to 100 weight parts of this powdered resin and was mixed therewith. This mass was treated similarly to Example 1 to obtain a molding. This molding had a dielectric dissipation factor of 2.5% (at 25° C), and had a bending strength of 51 kg/cm$^2$ at 25° C, a bending strength of 48 kg/cm$^2$ at 200° C, and a bending strength of 48.5 kg/cm$^2$ after a 300 hours heat treatment at 230° C.

EXAMPLE 9

A molding was prepared in the same manner as in Example 8 except that reaction was carried out at 150° to 155° C several minutes until the reaction mass was allowed to gelate, by using about 28.8 grams (0.072 mol) of Epicoat #828 in place of Epicoat #1001 and 15.1 grams (0.082 mol) of barbital in place of 5,5'-dimethyl hydantoin and without using dimethyl benzylamine; and thereafter the reaction mass was cooled rapidly. The molding thus obtained had a dielectric dissipation factor of 1.0 % (at 250° C), and had a bending strength of 45 kg/cm² at 25° C, a bending strength of 43 kg/cm² at 200° C, and a bending strength of 43.5 kg/cm² after a 300 hour heat treatment at 230° C.

What we claim is:

1. A heat-resistant thermosetting resin composition consisting essentially of the reaction product of at least one component (A), at least one component (B) and at least one component (C) under molar ratios satisfying the conditions $0 < B/B+C \leq 0.5$ and $1 \leq A/(B+C) < 2$ wherein:

component (A) is bis-imide of the general formula:

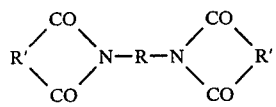

wherein R is a divalent radical selected from the group consisting of straight or branched alkylene radicals and having a ring of five to six carbon atoms, heterocyclic radical having at least any one of oxygen, nitrogen and sulfur, phenylene radical, polycyclic aromatic radical, and a plurality of phenylene or alicyclic radicals directly bonded with any one of — O —, —CH$_2$—, —SO$_2$—, —NH-CO—, —NR$_5$—, —NR$_5$R$_6$—, each of R$_5$ and R$_6$ being an alkyl radical of one to four carbon atoms, a cycloalkyl radical having an alicyclic ring of five to six carbon atoms or a phenyl radical and R' is divalent radical of an acid selected from the group consisting of maleic, citraconic and tetrahydrophthalic acid; component (B) is selected from the group consisting of cyanuric acid, isocyanuric acid and tris (epoxypropyl) isocyanurate; and component (C) is selected from the group consisting of pyromellitic diimide; benzophenone tetracarboxylic acid diimide; 2, 3, 6, 7-naphthalene-tetracarboxylic acid diimide; 3, 3', 4, 4'-diphenyltetracarboxylic acid diimide; hydantoin or derivative of the formula:

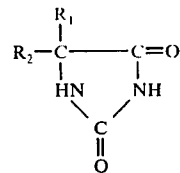

wherein R$_1$ and R$_2$ may be the same or different and represent hydrogen or one to three carbon atom alkyl radicals, and barbituric acid or derivative of the formula:

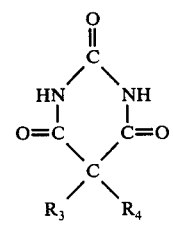

wherein R$_3$ and R$_4$ may be the same or different and represent hydrogen or one to five carbon atom alkyl radicals.

2. The resin composition of claim 1 where said component (A) is an N, N'-bis-imide of maleic acid.

3. A heat-resistant thermosetting resin composition of claim 2, wherein said N, N'-bis-imide of maleic acid is at least one selected from the group consisting of N, N'-4,4'-diphenylmethane-bis-maleimide; N, N'-4, 4'-diphenylether-bis-maleimide; N, N'-paraphenylene-bis-maleimide; N, N'-benzidine-bis-maleimide; N, N'-metaxylene-bis-maleimide; N, N'-1, 5-naphthalene-bis-maleimide; N, N'-4, 4'-diphenylsulphone-bis-maleimide; N, N'-4, 4'-diphenyl-phenylamine-bis-maleimide; N, N'-metaphenylene-bis maleimide and N, N'-3, 3'-(N, N'-metaphenylene-bis-benzamide)-bis-maleimide.

4. A heat-resistant thermosetting resin compositions of claim 1, wherein said component (C) is selected from the group consisting of hydantoin; 5, 5'-dimethyl hydantoin; 5-n-propyl hydantoin and 5-isopropyl hydantoin.

5. A heat-resistant thermosetting resin composition of claim 1, wherein said component (C) is selected from the group consisting of barbituric acid, barbital, phenobarbital, amobarbital, pentobarbital, secobarbital, butabital, ethylhexabital and butethal.

6. The resin composition of claim 1 wherein component (A) is N, N'-4, 4'-diphenyl-methane-bis-maleimide, component (B) is cyanuric acid and component (C) is selected from the group consisting of pyromellitic diimide, dimethyl hydantoin and barbital.

* * * * *